United States Patent [19]

Bryce

[11] 3,726,087
[45] Apr. 10, 1973

[54] COMBUSTION SYSTEMS

[75] Inventor: William Dean Bryce, Farnham, England

[73] Assignee: Minister of Aviation Supply in Her Britannic Majesty's Government of the United Kingdom of Great Britian and Northern Ireland, London, England

[22] Filed: Mar. 19, 1971

[21] Appl. No.: 126,158

[30] Foreign Application Priority Data

Mar. 20, 1970 Great Britain.....................13,576/70

[52] U.S. Cl...............................60/39.65, 60/39.74 R
[51] Int. Cl...................................F02c 7/26
[58] Field of Search......................60/39.65, 39.72 R, 60/39.74 R, 249, 39.77, 39.09 R; 123/142; 138/40; 431/326

[56] References Cited

UNITED STATES PATENTS

| 2,547,959 | 4/1951 | Miller | 60/39.65 |
|---|---|---|---|
| 2,616,257 | 11/1952 | Mock | 60/39.65 |
| 2,716,330 | 8/1955 | Way | 60/39.65 |
| 2,775,094 | 12/1956 | Buckland | 60/39.65 |
| 2,825,203 | 3/1958 | Bertin | 60/249 |
| 3,058,306 | 10/1962 | Schlumbohm | 60/39.77 |
| 3,516,253 | 6/1970 | Allport | 60/39.77 |

FOREIGN PATENTS OR APPLICATIONS

| 393,022 | 10/1908 | France | 123/142 |
|---|---|---|---|
| 642,257 | 8/1950 | Great Britain | 60/39.65 |
| 674,840 | 2/1930 | France | 123/142 |
| 1,006,128 | 1/1952 | France | 60/39.65 |
| 1,932,881 | 8/1970 | Germany | 60/39.65 |

*Primary Examiner*—Douglas Hart
*Attorney*—Cameron, Kerkam, Sutton, Stowell & Stowell

[57] ABSTRACT

An air inlet for an internal combustion engine comprises a plurality of tubes, each tube being so dimensioned that airflow therethrough changes from laminar to turbulent at a predetermined Reynolds number. Such an inlet is particularly useful in the combustion chamber of a gas turbine engine, where it can be used to slow down air velocity in engine-out flight conditions, while offering little resistance to flow when the engine is operating. The reduction in velocity assists in the engine relight procedure.

6 Claims, 5 Drawing Figures

PATENTED APR 10 1973 3,726,087

COMBUSTION SYSTEMS

This invention relates to air inlets for internal combustion engines. Air inlets according to the invention are particularly suitable for use in combustion chambers for gas turbine engines, especially in such chambers as used in engines for aircraft propulsion.

The design of a gas turbine engine involves many compromises. In general, such engines are designed to be at their most efficient at a particular condition, which in an aircraft engine is normally the altitude cruise condition, and relative inefficiency has to be accepted at other conditions. Problems of engine operation have also to be considered, and these tend to be greatest at conditions other than the design condition.

When the speed of a gas turbine engine is reduced, the air pressure, and hence the air density, within the combustion chambers of the engine are also reduced. This reduction in density is associated with a reduced fuel flow, and the reductions in density and fuel flow must be such that a satisfactory fuel/air ratio is maintained. As a result of the reduced fuel flow the flame within the chamber becomes less stable. It so happens that, in general, the corresponding reduction in air velocity through the chamber is relatively insignificant, and the danger of the flame being blown out by the airflow is therefore increased. This problem is greater in an aircraft engine operating at altitude, where the air density in the combustion chamber is reduced compared with ground level operating conditions.

Whilst engine controls have been developed to a stage where inadvertent flame extinction in an aircraft engine in flight is rare, provision still has to be made for relighting an extinguished engine. Also, in some instances, particularly in military operations, it is operationally advantageous to temporarily shut down one or more engines of a multi-engined aircraft, and again provision must be made for engine relighting.

When an engine is stopped in flight air will continue to flow through it, due to the forward II—of the aircraft, at a speed of the same order as the speed of the aircraft. The air pressure and density within the engine combustion chamber or chambers will be considerably lower than during normal engine operation at the same speed and height. It will be clear from the above explanation that these conditions will make relighting of the engine difficult, due to the tendency of the airflow to blow out the flame before it can get established.

This invention provides a form of air inlet to an internal combustion engine which compensates for reduction in air pressure by reducing the airflow velocity through the inlet, and which does so without the use of moving parts.

The invention makes use of the fact that when a fluid flows through a pipe, the pressure loss per unit length due to wall friction is a function of the pipe Reynolds number ($Vd/\nu$), where $V$ is the entry flow velocity, $d$ the hydraulic diameter of the pipe, and $\nu$ the kinematic viscosity of the fluid. At low values of Reynolds number the pipe flow is laminar and the pressure loss is high, whilst at high values of Reynolds number the flow becomes turbulent and the pressure loss is reduced.

According to the invention, an air inlet for an internal combustion engine comprises a plurality of tubes, each tube being so dimensioned that airflow therethrough changes from laminar to turbulent or vice versa over a predetermined range of Reynolds number.

Each air inlet may be constructed by stacking and holding together a plurality of pipes, but a preferred form of inlet comprises a mesh of stacked corrugated metal sheets.

Various embodiments of the invention as used with a combustion chamber of a gas turbine engine will now be described, by way of example only, with reference to the drawings, of which:

FIG. 1 illustrates the variation of pressure loss through a tube with Reynolds number, and indicates the regions of laminar, transitional and turbulent flow and their relationship to typical engine operating conditions.

Figure 1:
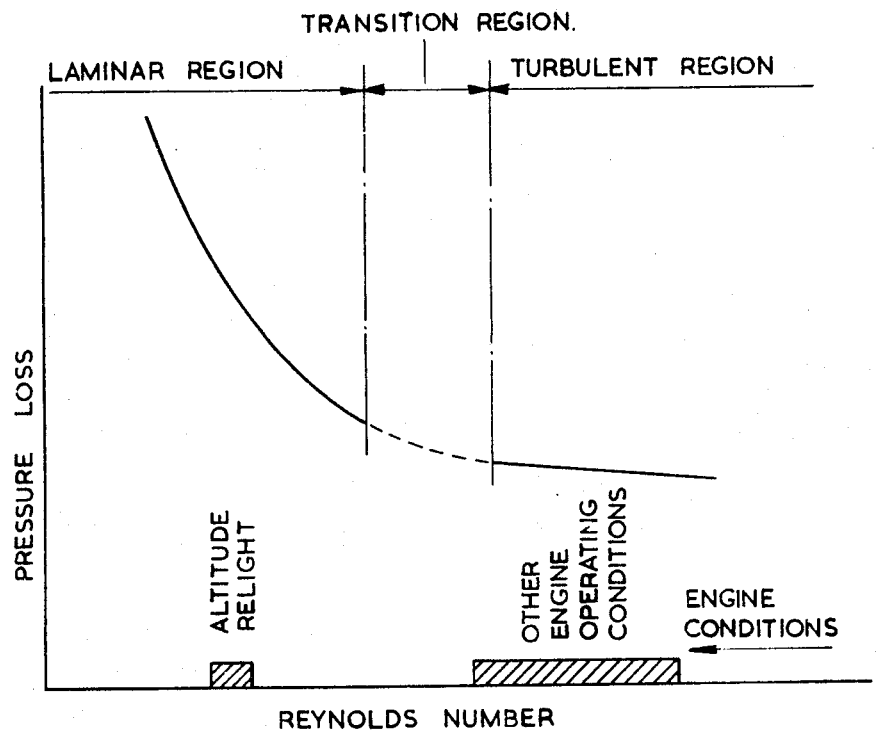
FIG. 1 is a graph (not to scale) showing the variation of pressure loss in a pipe with Reynolds number.
Figure 2:
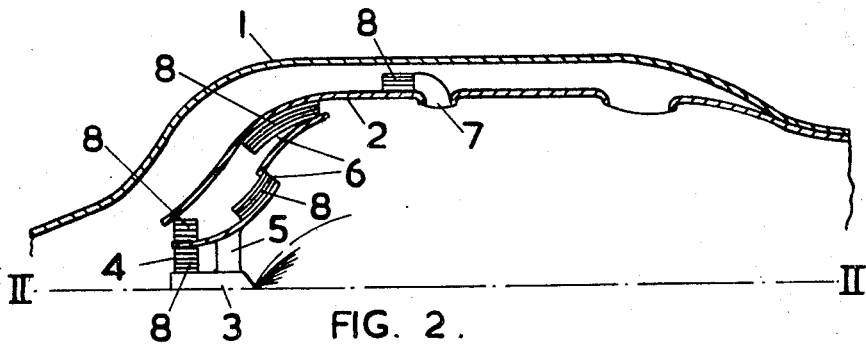
FIG. 2 is a schematic cross-section of part of a combustion chamber.

FIG. 2 is a diagrammatic cross-sectional view of a combustion chamber. The chamber is symmetrical about the line II—II, and only one half is shown. The chamber has an outer casing 1 and an inner casing, or flame tube, 2. Fuel is supplied through a sprayer 3 into air entering through an entry duct 4. Swirl is imparted to the air entering through the duct 4 by blades such as that shown at 5. Air is also admitted to the combustion chamber through ducts 6, the primary function of this flow being to cool the metal surfaces of the chamber, and through holes, such as that shown at 7, in the flame tube 2. The holes 7 are commonly referred to as primary combustion holes, and are designed to admit an amount of air sufficient to provide the correct fuel/air ratio in the chamber, at the design condition. Stacks 8, each comprising a plurality of tubes, are shown in each of the ducts 4 and 6, and adjacent the primary combustion holes 7.

Figure 3:
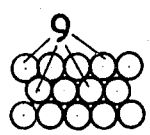
FIGS. 3 to 5 are end views of three types of air inlet construction.
Figure 4:
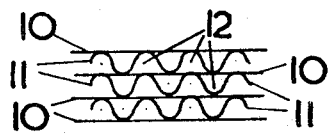
Figure 5:
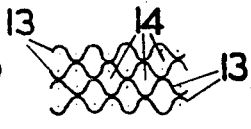

Three alternative constructions of stacks 8 are shown diagrammatically in FIGS. 3 to 5. FIG. 3 shows a stack constructed from a plurality of cylindrical tubes 9 bound, or bonded together. As shown in FIG. 4 alternate sheets 10, 11 of plain and corrugated material are bonded together to provide a plurality of tubes such as those shown at 12. The construction shown in FIG. 5 is similar to that shown in FIG. 4, but in this case corrugated sheets 13 are bonded together with the peaks of one sheet 13 contiguous with the troughs of the adjacent sheet 13, to give a plurality of tubes such as those shown at 14.

The tubes 9, 12 or 14 are so dimensioned that the airflow therethrough is turbulent when the engine is running at normal operating conditions and becomes laminar below a predetermined condition. It should be understood that the pressure in the combustion chamber is influenced by all the air inlets thereto, and that the effect on this pressure when the airflow through one stack 8 changes from laminar to turbulent, or vice versa, is small. The result of a change in airflow through a stack 8 from turbulent to laminar will therefore be a marked reduction in airflow velocity through the tubes of the stack 8.

Design and positioning of the stacks 8 and of the tube dimensions will depend on the result required. When the invention is used to facilitate aircraft engine relight procedure, flow conditions will be critical only in certain sectors of the combustion chamber, and a stack 8 in the duct 4 may be sufficient to give the required result.

The tubes forming the stack 8 in duct 4 may be so dimensioned that the airflow therethrough is laminar when the engine is stopped with the aircraft in cruising flight at altitude, but becomes turbulent as soon as the engine is restarted and is running at its flight idling speed. With laminar flow the velocity of the air passing into the combustion chamber through the stack 8 will be low. Once the flow becomes turbulent, the pipe loss is considerably reduced and the adverse effects on engine performance are minimized. The swirler blades 5 in the duct 4 may be dispensed with by making the tubes 9, 12 or 14 curved, or by constructing the stack 8 out of a series of sections, the sections being arranged at various angles one behind the other to simulate curved tubes.

Stacks 8 of tubes 9, 12, 14 may be advantageously used for other reasons than for that described above. For example, they may be used to control the velocity of the cooling air over combustion chamber surfaces, or in the air passages of vaporizer units for gas turbine engines, where the airflow velocity tends to be undesirably high at low fuel flow rates.

What I claim is:

1. In a gas turbine engine in an aircraft designed for flight at high altitudes, at least one combustion chamber comprising an outer casing, an inner casing, means for supplying fuel to within the inner casing, means for igniting the fuel, and means for admitting air to within the inner casing, a proportion of the air being admitted to the vicinity of an outlet of the fuel supply means through an inlet comprising a plurality of tubes, each tube being so dimensioned that airflow therethrough is turbulent during normal engine operation, and is laminar when the aircraft is in a cruising flight condition at altitude with the fuel un-ignited.

2. A combustion chamber as claimed in claim 1 wherein the inlet comprises a mesh of stacked corrugated sheets, spaces between adjacent sheets forming the tubes.

3. A combustion chamber as claimed in claim 1 wherein the inlet comprises alternate sheets of plain and corrugated material, stacked and held together, spaces between adjacent sheets forming the tubes.

4. A combustion chamber as claimed in claim 1 wherein the inlet comprises a plurality of pipes stacked and held together.

5. A combustion chamber as claimed in claim 1 wherein the inlet tubes are curved.

6. A combustion chamber as claimed in claim 1 wherein the inlet is constructed from a series of sections, the sections being arranged at various angles one behind the other.

* * * * *